United States Patent Office.

CONSTANT W. WADSWORTH AND CARL GULLBERG, OF PEEKSKILL, NEW YORK.

Letters Patent No. 112,657, dated March 14, 1871.

IMPROVEMENT IN ATTACHING THE HAIR-SPRINGS OF WATCHES.

The Schedule referred to in these Letters Patent and making part of the same.

*To all whom it may concern:*

Be it known that we, CONSTANT W. WADSWORTH and CARL GULLBERG, of Peekskill, in the county of Westchester and State of New York, have invented a new and useful Improvement in Attaching the Hair-spring Collet to the Balance-wheel Staff; and we do hereby declare that the following is a full, clear, and exact description thereof, which will enable others skilled in the art to make and use the same, reference being had to the accompanying drawing forming part of this specification.

Figure 1 is a top view of a balance-wheel, to which our improvement has been applied.

Figure 2 is a detail sectional view of the same taken through the line $x\ x$, fig. 1.

Figure 3 is the same sectional view as fig. 2, but showing a modification of the invention.

Our invention has for its object to furnish an improved means for attaching the hair-spring collet to the balance-wheel staff, by the use of which inexperienced workmen will be less liable to injure fine watches, chronometers, &c., which will enable the hair-spring collet to be removed easily, quickly, and without danger of throwing the balance-wheel out of true, and which will enable the spring to be easily put "in beat" after having been removed from the staff; and It consists in the combination of a collar or sleeve, having a screw-thread cut upon its inner or outer surface, with the hair-spring collet and balance-wheel staff, whether the screw be cut upon said collet or staff, as hereinafter more fully described.

A represents a balance-wheel of a watch;

B is the staff; and

C is the collet, to which the hair-spring is attached in the ordinary manner.

D is a collar or sleeve, which is interposed between the staff B and collet C.

In figs. 1 and 2 the staff is represented as having a screw-thread cut upon its upper end, upon which the collar or sleeve D is screwed, the said collar, in this case, having a screw-thread cut upon its inner surface.

In this case the collet C is slipped upon the collar D and is held by friction, the collet and collar being removed together from the staff by unscrewing the said collar.

In the case represented in fig. 3 the collar D is slipped upon the staff, where it is held in place by friction, and has a screw-thread cut upon its outer surface, upon which is screwed the collet C, which collet has a screw-thread cut in its inner surface.

The construction first described is applicable in manufacturing new work. The construction last described may be applied to new and old work in all watches made in America or Switzerland.

By this construction there will be no difficulty in adjusting the spring in beat after it has been removed from the staff, as the screw-thread will bring it into the exact position.

This construction also prevents all danger of getting the balance-wheel out of true in trying to remove the hair-spring collet.

Having thus described our invention,

We claim as new and desire to secure by Letters Patent—

The collar or sleeve D, having a screw-thread cut upon its outer or inner surface, in combination with the balance-wheel staff B and the hair-spring collet C, one or the other of the parts B C having a screw-thread cut upon it corresponding with the screw-thread of the said collar or sleeve D, substantially as herein shown and described, and for the purposes set forth.

C. W. WADSWORTH.
CARL GULLBERG.

Witnesses:
STEPHEN LENT,
D. W. TRAVIS.